United States Patent [19]

Stewart et al.

[11] 3,882,802

[45] May 13, 1975

[54] SOLID WASTE INCINERATOR

[76] Inventors: Earl A. Stewart, 29 Albert St., Aylmer East, Quebec; William Joseph Gaboury, 111 Maple Grove Rd., Lucerne, Quebec, both of Canada

[22] Filed: May 20, 1974

[21] Appl. No.: 471,369

[52] U.S. Cl............................ 110/14; 432/117
[51] Int. Cl. .................................... F23g 5/06
[58] Field of Search ........................ 110/14; 432/103–111, 117

[56] References Cited
UNITED STATES PATENTS

| | | | |
|---|---|---|---|
| 1,232,724 | 7/1917 | Seelbach | 110/14 |
| 1,698,454 | 1/1929 | Shaaf | 110/14 |
| 3,323,474 | 6/1967 | Hansen | 110/14 X |

Primary Examiner—Kenneth W. Sprague

[57] ABSTRACT

For solid waste disposal including large bulk items such as crushed car bodies, chesterfields, etc., an incinerator in the form of a rotatable open ended horizontal drum with substantially one-half of its circumference for much of its length consisting of a normally closed hatchway whose closure, here shown as a cooperating pair of 90° arc hinged doors, is openable only at top and bottom center positions for gravity loading and emptying respectively. Near one open end this rotatable drum retort is fired by fuel burners with products of combustion being discharged from the opposite open end where fly-ash can be electromagnetically trapped and residual combustible gases subjected to subsequent burning in a Dutch oven to reduce emission of smoke, offensive odours and deleterious air pollutants. Automatic controls monitor the loading, burning and emptying cycles of the incinerator, unlocking, opening, closing and locking the doors, firing the burners, rotating the drum etc. in the required succession. Non-combustible content of the waste is emptied onto an inclined gate for sortation, screening, sluicing and retrieval. Heat produced in the incinerator may be utilized as found most advantageous in the circumstance.

10 Claims, 6 Drawing Figures

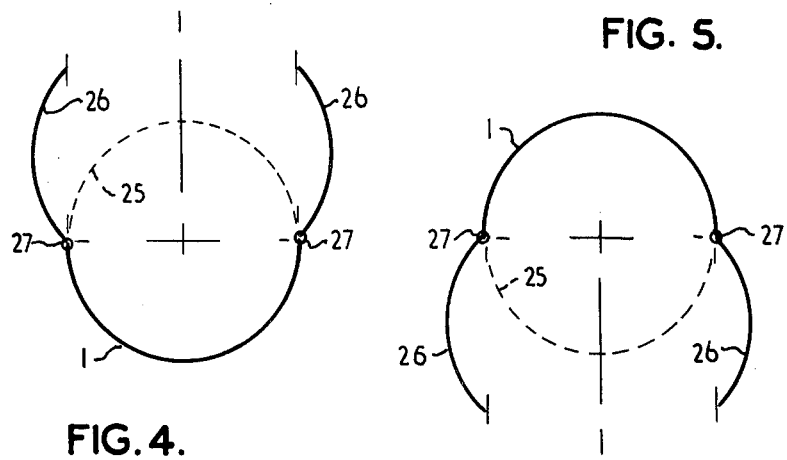
FIG. 5.
FIG. 4.
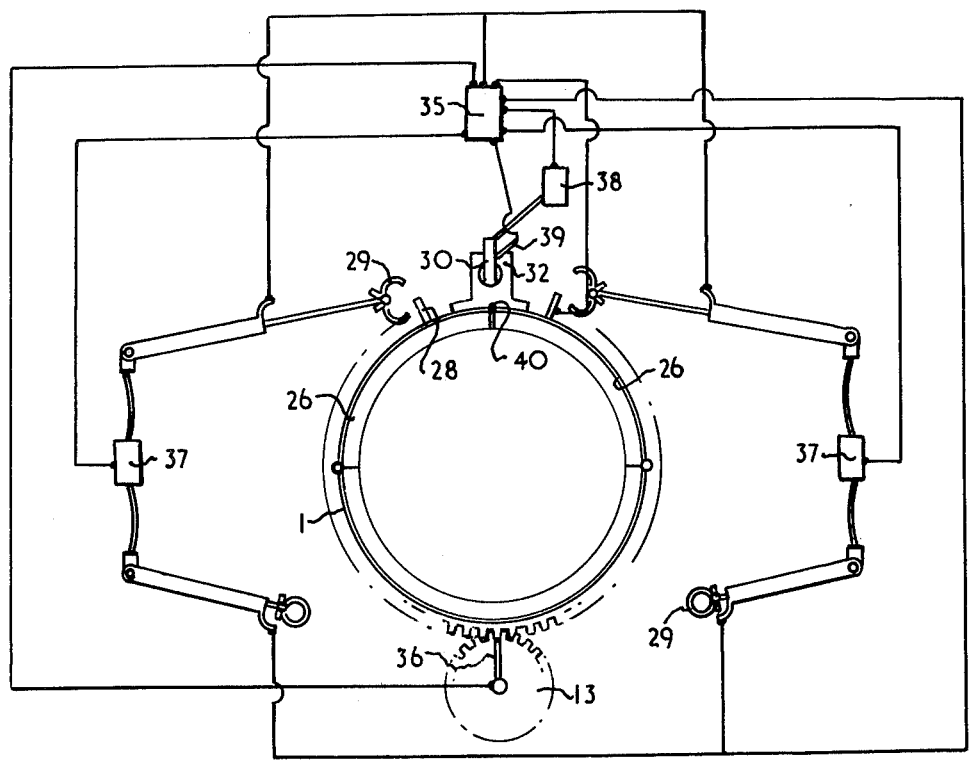
FIG. 6.

SOLID WASTE INCINERATOR

This invention relates to improvements in a solid waste incinerator and appertains particularly to one suitable for municipal, commercial and industrial installations, being designed to handle large units of solid waste such as crushed car bodies, chesterfields, mattresses, bulky trash and the like.

THE ART

Elongated horizontal kilns and rotary incinerators are known and used in various ways for treating sewage wastes, sludge and refuse mater al, e.g. Canadian Pat. No. 748,190— Ramstack, Jr., and U.S. Pat. No. 3,413,937— Bojner et al, D. N. Garver et al U.S. Pat. No. 3,489,108.

BACKGROUND OF THE INVENTION

Increasing concern for the environment, legislation restricting or prohibiting open burning of trash, and the mountains of trash and garbage being produced in urban centers today is now threatening major solid waste disposal crisis in many areas. This situation coupled with the effort to reclaim valuable non-combustible components such as iron and non-ferrous metals, calls for a better, efficient and practical way of disposing of garbage, large units of trash and bulk solid waste in keeping with modern regard for pure air and fuller utilization of our non-renewable resources.

SUMMARY OF THE INVENTION

Accordingly, it is an object of this inveniton to provide an apparatus for disposal of large volumes of garbage and bulky solid wastes by burning the combustible components in a controlled situation and retrieving the valuable non-combustibles.

A further object of the invention is to provide an incinerator for solid wastes that can be expeditiously loaded and emptied completely.

A further object of the invention is to provide a solid waste incinerator in the form of a rotatable drum with substantially one-half its circumference as a normally closed hatchway that is opened automatically at top center and bottom center for loading and emptying respectively.

A further object of the invention is to provide an incinerator of the nature and for the purpose described having an elongated rotatable drum retort designed to accommodate and treat heavy, sizeable units of solid waste under automatic control for drum rotation, door operation, burner firing, etc. in the complete work cycle.

A still further object of the invention is the provision of an incinerator of the character described suitable for installation as an auxiliary to existing refuse burners in large cities, and readily adaptable to and connectible with different ancillary units as individual situations may require.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

BRIEF DESCRIPTION OF THE DRAWINGS

FIGS. 4 and 5 are schematic vertical cross sectional views showing the incinerator doors open at top center and bottom center positions for loading and emptying, respectively;

FIG. 6 is a schematic lay-out of the automatic control mechanism.

DETAILED DESCRIPTION OF THE DRAWINGS

Figure 1:
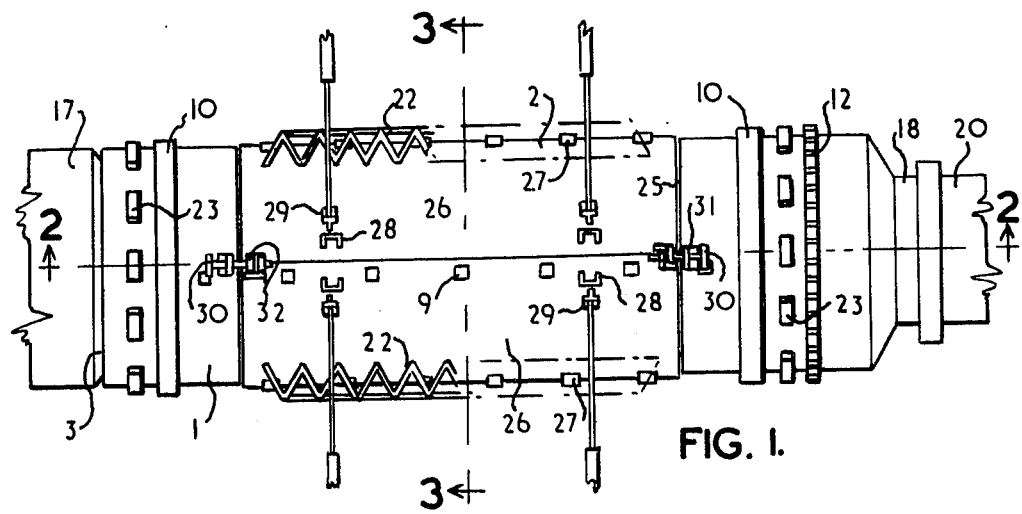
FIG. 1 is a plan view of the incinerator.
Figure 2:
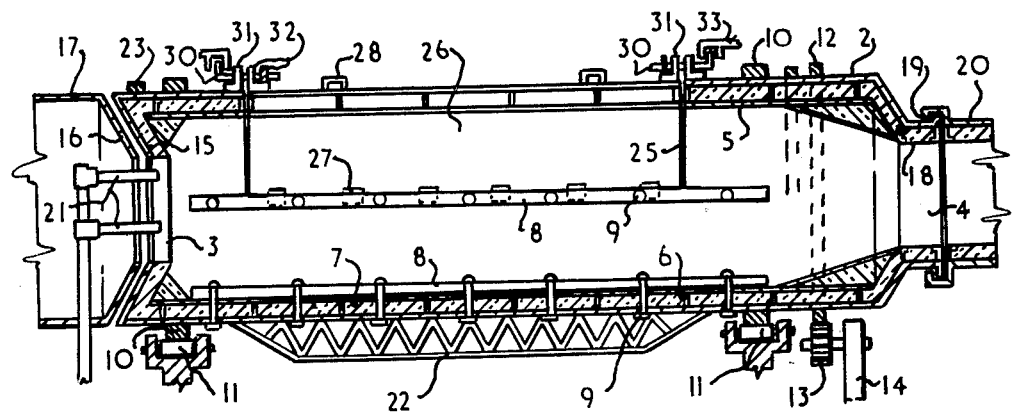
FIG. 2 is a vertical longitudinal section thereof, as taken on line 2—2.
Figure 3:
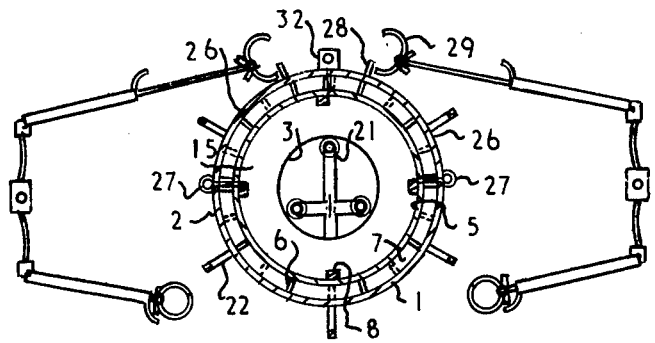
FIG. 3 is a vertical transverse section as taken on line 3—3 of FIG. 1.

The incinerator illustrated and described in this specification is structurally designed with ample dimensions and adequate strength for handling large sized items of solid waste, heavy bulky trash and high volumes of garbage. Accordingly, the retort 1 is shown as comprising a horizontal cylinder 2, open at both ends 3 and 4 and approximately 50 or 60 feet in length and 12 feet in diameter. The cylinder 2 may be designated the outer shell for concentrically within it lies an inner shell 5 spaced by staggered rows of radial reinforcing members 6 welded at their ends to both the shells. Firebricks 7 nest among and are secured by the welded reinforcing members and occupy the space between said inner and outer shells. If desired an insulating blanket of asbestos may envelop the brick lining, being positioned immediately within the outer shell 2. A plurality of circumferentially spaced, longitudinally extending tumbling bars 8 are secured on the inside of the retort as by nuts and bolts 9 and so are readily replaceable when necessary.

The retort is rotatable on its longitudinal horizontal axis, having a heavy tire 10 near each end supported on suitable rollers 11 and also a gear wheel rim 12 driven by a reduction gear pinion 13 with appropriate power drive 14.

At the open inlet end 3, the retort shell 2 has an inwardly extending flange 15 shaped as a truncated cone for accommodating a correspondingly shaped open ended projecting cone-like part 16 of a coaxial fixed housing 17, in longitudnally spaced relation to afford an air inlet for an induced draft. At the opposite discharge end 4, the retort has a neck 18 of reduced diameter terminating in an exterior flange 19 for gas-seal connection with an ancillary unit 20 such as a secondary combustion chamber, fly-ash trap or the like.

Fuel fired burners 21 may be mounted in the fixed housing unit 17 and project into the retort through the open inlet end 3. For its intended purpose, this insulated fire-brick lined retort can operate at a temperature of about 700° F or within a range of approximately 550° F to approximately 850° F.

Because of the length of the retort and its gross height when fully loaded, longitudinally running radial bridge type reinforcements 22 may be applied to the outer shell and where necessary be counterbalanced by weights 23 to the required amount.

A special feature of the rotatable horizontal cylinder retort is the provision for easy rapid gravity-loading and emptying by a large hatchway 25 occupying substantially one-half the circumference of the cylinder and extending for much of its length, preferably more than 50 per cent and in the range of approximately 40 to approximately 75 per cent. A closure for this hatchway is here shown as consisting of a pair of companion doors 26 each in the form of a 90° arc connected along their remote sides to the retort by hinges 27 at diametrically opposite sides of the cylindrical retort, said doors being openable so that their free sides are spaced a distance at least equal to the diameter of the retort for loading or emptying, as seen clearly in FIGS. 4 and 5. The doors have handle grips 28 near their free sides and automatic grapples 29 for releasably engaging them to open and close the doors at top center loading and bottom center emptying positions. Except for loading and emptying, the normally closed doors are locked at each end by a longitudinally retractable bolt 30 slidable in a barrel 31 on the outer cylinder 2 that extends into registering bores in overlapping companion keepers 32 on the respective doors. Automatic bolt actuators 33 operate in harmony with the automatic door openers 29 being subject to a master controller that monitors the complete work cycle of the incinerator as regards closing and locking the doors, rotating the retort, firing the burners, etc., all in the required succession.

In the schematic lay-out of the automatic control mechanism for monitoring the rotatable incinerator, shown in FIG. 6, a master controller 35 is supplied from a suitable electric power source. A limit switch 36 on drive gear 13 assures the rotatable retort stops at only top center and bottom center positions. When retort stops turning, a signal from time switch 36 to master control 35 relays to pneumatic jack 37 causing appropriate top position grapples 29 to engage door handles 28 whereupon master control sends further signal to pneumatic actuator 38 to retract locking bolt 30. When doors are unlocked, limit switch 39 signals master control that directs jacks 37 to fully open doors 26 for loading as seen in FIG. 4. When fully loaded, a human attendant pushes circuit closing button to master control 35 that signals pneumatic jacks 37 to close doors 26, thereupon a limit switch 40 signals master control that relays pneumatic actuator 38 to shoot bolt 30 into locking position, after which limit switch 39 signals to master control to jacks 37 to disengage and withdraw grapples 29 and the limit switch 36 is instructed to resume rotation of the retort. The fuel burners 21 turn up and the incineration begins. On completion of the burning period the rotation of the retort stops with the doors in bottom center position when the same unlocking and opening of the doors (see emptying position of doors in FIG. 5) occurs and the closing and locking of the doors and the rotating of the incinerator for one-half revolution follows, bringing the doors to top center loading position for the completion of a work cycle.

Though capable of many uses, the various natures of which will alter the assembly and relation of ancillary units, a contemplated employment of the incinerator calls for having it in an enclosing structure to confine or reduce noise, dust and odours. The loading can be done by conveyor, grab claws or magnetic hoist depending on the type of solid waste being treated. Beyond the discharge end 4, the outlet neck leads into a second combustion chamber such as a Dutch oven where unburnt combustible gases can be consumed and fly-ash precipitated in an approved manner to minimize the final emissions that are metered by a $CO_2$ and $O_2$ sensing device. In the ancillary unit beyond the retort, an induced draft fan with a volume exceeding that of the combustion gases can be located that draws air in at the open end 3 and also through the hatchway 25 when the doors are opened for either loading or emptying to reduce dust and odours. When the retort load has been reduced to non-combustibles, it is emptied by gravity through the opened hatchway at bottom center position on to an inclined and/or shaking grate, being sprayed by a closed circuit water supply. Further sortation, screening, sluicing and retrieval follows as may be found best to maximize salvage values.

The foregoing description is presented for the purpose of illustration only and is not to be regarded as restricting in any way the scope of the invention as defined in the appended claims.

What is claimed is:

1. A solid waste incinerator comprising an elongated cylindrical retort rotatable about a horizontal axis, rollers supporting said retort and means for rotating said retort on said supporting rollers, said cylindrical retort having a hatchway which extends in the circumferential direction along substantially one-half the circumference of the retort, and a closure for said hatchway which can be opened only at top center and bottom center positions for loading the waste material and unloading the burned material respectively, said closure, in its open position, permitting full passage of the material through said hatchway whose width is equal to the full interior diameter of said retort.

2. The device according to claim 1, wherein said hatchway extends in the longitudinal direction along at least one-half the length of said retort.

3. The device according to claim 1, wherein said hatchway closure consists of a pair of normally closed and locked companion 90° arc doors hingedly connected to said retort at their remote edges.

4. The device according to claim 3, having releasable locking means for said doors wherein said doors may be selectably openable at top center position or bottom center position for loading or unloading respectively, said locking means being releasable when the rotatable retort is stopped.

5. The device according to claim 4, having a master controller monitoring the complete work cycle of the incinerator including, in proper sequence, closing and locking the doors, rotating the retort, firing the incinerator, and on completion of a burning period stopping the rotation of the retort with the doors in unloading bottom center position, unlocking and opening the doors to discharge the burned material, closing and locking the doors, rotating the retort for one-half revolution and stopping the same at top center position for loading, and finally unlocking and opening the doors.

6. The device according to claim 1, wherein said elongated horizontal retort includes concentrically spaced inner and outer cylindrical shells with reinforcing means therebetween.

7. The device according to claim 6, having fire-bricks disposed in the space between said concentric cylindrical shells.

8. The device according to claim 1, having longitudinally extending tumbling bars on the inner circumference of said cylindrical retort.

9. The device according to claim 1, wherein said rotatable cylindrical retort is open at both ends, one end providing an air inlet and the other as an outlet for the discharge of smoke and gaseous products of combustion.

10. The device according to claim 9, wherein the open air inlet end of said retort is in the form of an inwardly extending truncated cone designed to accommodate in spaced relation a correspondingly shaped projecting part of a coaxial fixed housing and the open discharge end of the retort has an attaching neck for connection in gas-seal relation with an ancillary unit such as a secondary combustion chamber, fly-ash trap or the like.

* * * * *